April 10, 1951 L. T. FROST 2,548,011
SONIC TEACHER
Filed March 15, 1949
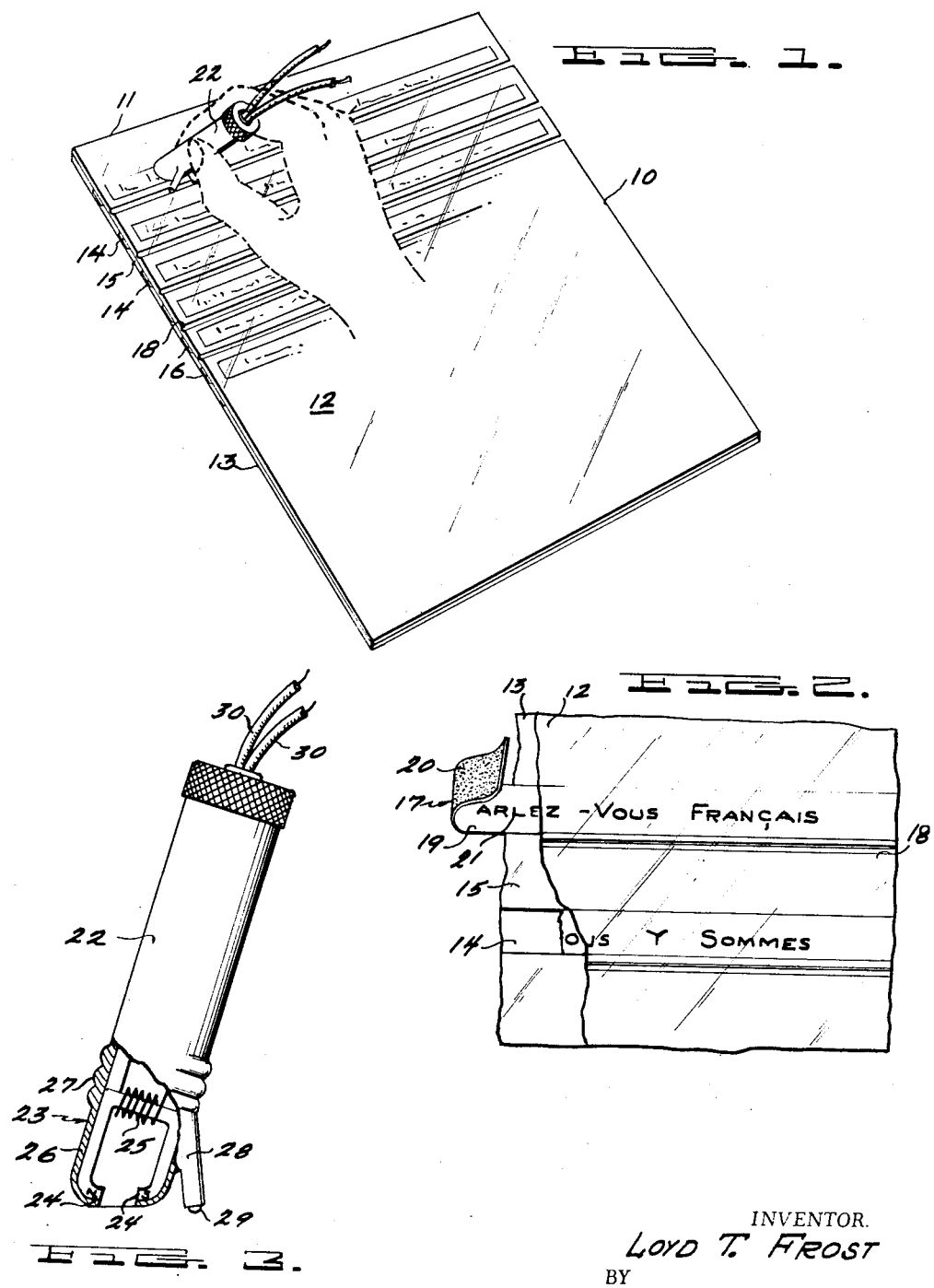
INVENTOR.
LOYD T. FROST Patented Apr. 10, 1951

2,548,011

UNITED STATES PATENT OFFICE 2,548,011

SONIC TEACHER

Loyd T. Frost, Riveredge, N. J.

Application March 15, 1949, Serial No. 81,458

6 Claims. (Cl. 35—35)

This invention relates generally to teaching devices. More particularly, the invention embraces a device for teaching language by electro-mechanically reproducing the sound of words as the printed word is visually scanned by the student.

An object of the invention is to provide a self-teaching device in which the visual and audible text is synchronized and in which the text may be readily interchanged.

Yet another object of the invention is to provide a light-weight portable visual and audible language teaching device simple in construction and wherein working surfaces of the text are protected against wear.

Still another object of the invention is to provide means for teaching language rapidly and with maximum acuity by exercising simultaneously the senses of sight and hearing.

With these and other objects in view, the invention consists in the elements to be hereinafter set forth and claimed with the understanding that the elements comprising this invention may be varied in construction, proportion and arrangement without departing from the spirit and scope of the appended claims.

A number of sonic self-teachers have heretofore been suggested employing recordings of a written text. In none of the devices heretofore suggested, however, has written text been combined in unitary contiguous relation with a sound track itself. The advantage of this relation is far reaching. If the student can conjunctively exercise the senses of sight and hearing, the exercise of the one complementing the other, it will be appreciated that a more accurate and rapid teaching process may be affected than has hitherto been possible.

In general, the invention comprises in combination a base plate and cover made from any suitable material such as translucent plastic material. The base plate serves as a housing for magnetized strips or tapes of the type now generally utilized in tape recorders. This magnetized strip has written text printed upon a non-magnetic face thereof. The words and syllables of the written text correspond in position on the tape with respect to magnetic recording of sounds of such words and syllables which have been produced on the magnetic surface of the tape. In operation, therefore, when the student passes a magnetic pickup device over the tape as he reads, audible sounds of the words and syllables of the text may be reproduced in a loud speaker or ear phones. Alternately, conventional groove recordings may be used and translated into audible sounds by a needle and crystal or similar type pickup. Thus, simultaneously with the reading of the text, the student's auditory senses are exercised and thorough comprehension is effected both mentally and physically through speech imitation.

In the drawings:

Figure 1 is a view in perspective of the invention as used;

Figure 2 is a fragmentary perspective view showing the arrangement of basic elements of the invention; and Figure 3 is a fragmentary vertical cross-sectional view of a typical pickup having a magnetized head.

Referring more particularly to the drawings, there is shown in Figure 1 a base plate or housing 10 preferably made of transparent plastic sheet material. This sheet material is folded upon itself as at 11 providing superposed plies 12 and 13. Arranged in horizontal series on inner face of the lower ply 13 are a plurality of grooves 14 with lands 15 therebetween which cooperate with the upper ply 12 to form a series of parallel channels 16 for detachably holding strips of sound recording tape 17. The two plies 12 and 13 may be suitably secured together such as by heat sealing the lands 15 to the upper ply 12.

Adjacent and immediately below each channel 16 is impressed, on upper surface of the ply 12, a guiding groove 18 semi-circular in section and parallel with its adjacent channel. As seen in Figure 1, the channels 16 and grooves 18 extend horizontally completely across the housing 10. The purpose of semi-circular grooves 18 is to provide means for guiding a pickup device, to be described, accurately with relation to the tapes 17.

The removable sound recording tape 17 referred to above comprises plain paper or plastic strip as shown in Figure 2 having a plain surface 19 and a magnetizable surface 20. Upon the plain surface 19 of the strip a written text 21 is printed. This text serves as visual announcement of the audible sounds which are created on operation of the instrument. Surface 20 is impregnated with a film of readily magnetizable material such as a composition comprising a binder uniformly impregnated with iron oxide dust.

A sound track is produced on the tape 17 in usual manner by magnetizing longitudinal increments of the iron oxide film according to sound vibrations spoken into a microphone. The visual text is printed on the plain surface of the tape with the words or syllables thereof corresponding in longitudinal position on the tape with the magnetic reproductions thereof on the surface 20.

In actual operation the student manually moves a magnetic pickup such as indicated generally as 22 in Figures 1 and 3, contiguously with respect to the recording tape and directly over the tape 17 throughout the operation. However, it will be noted that the tape is protected by the upper ply 12 of the housing 10. As shown in Figure 1, the pickup is shaped to conform to normal manual grip. The pickup 22 comprises a conventional electro-magnetic head 23 as shown in Figure 3 having opposed poles 24 and coil 25. The head 23 is housed in a tubular casing 26 having gripping surfaces 27 circumferentially disposed. To provide facile and accurate manual movement of the head across the sound track, a pair of spaced legs 28 are provided on casing 26 and extend downwardly at an angle thereto. Roller bearings 29 are imbedded at the extremities of the legs 28, the said bearing conforming in diameter to capacity of grooves 18 in which they ride as the pickup is moved across the tape 17.

In operation the coil 25 is connected by leads 30 to a suitable amplifier, the output of which is employed to actuate a loud speaker or earphones to audibly reproduce the sound track as the pickup is moved along the tape. Thus it will be appreciated that simultaneous interplay of the senses of sight and hearing may be effected by moving the pickup across the tape with the bearings 29 riding within grooves 18. As the pickup is moved across the tape, the printed text is observed in conjunction with the reproduced sounds of the words and syllables.

It is an important feature of the invention that both recording by printing on the non-magnetic surface and recording by electro-magnetism, be synchronized. Actually, space occupied by the words and phrases of the written text are in superposed visual relation with the length of the invisible sound track which has been created, so that audible sounds will coincide with visual perception vowel for vowel.

Teaching by visible and audible means naturally requires that the student practice those phases of study most frequently which he understands least well. For this reason the synchronization of written and magnetic recorded text is of paramount importance. Should the student desire to repeat phases of the text which are least understood and disregard the preceding text, he may insert his receiver instrument within groove 18 directly beneath the written text and on manipulation, the desired auditory response is accomplished, the irrelevant text by-passed.

It will also be appreciated that similar teaching might be accomplished where strips of printed paper are inserted within a housing, each sheet having written text in both translated and untranslated form. Further, a grooved sound track, such as is used in phonograph recordings, may be employed in lieu of the magnetic tape recording described. In such case the strip inserts may be made of a suitable plastic material bearing the printed text and grooved in conventional manner to form the corresponding sound track. The sound track groove will, of course, be exposed to cooperate with a needle and crystal or other pickup head which will be moved across the groove and reproduce the sound track undulations of the groove.

The invention encompasses utilizing the stylus 22 not only as a pickup device, but also as a recording and censoring instrument. Preparation of the stylus for recording, erasing or receiving may be made by operating a suitable selector capable of preparing the stylus for its desired function.

From the foregoing it will be appreciated that various modifications in structure, design, and principle may be created in the device such as employing strips having both translated and untranslated text recorded, utilizing other forms of pre-recorded, and applying the device to the teaching medium of music, history and the like without departing from the spirit of the invention. It is to be noted that the inventor does not intend limiting himself to the precise details set forth, but rather that he reserves the right to those modifications and alterations which normally follow from the concept as disclosed.

I claim:

1. In a device of the type for teaching including a continuous sound track and pickup means therefor for self-teaching the sound of a text, an elongated strip carrying the sound track, and said text imprinted on the strip, the sound symbols of the text being superposed over and coextensive with and running concurrently with corresponding sound producing elements of said track so that the sound symbols may be read directly from the text as the sound is produced.

2. In a device of the type for teaching including a continuous sound track and pickup means therefor for self-teaching the sound of a text, an elongated strip having opposed surfaces, one of said surfaces comprising magnetic material constituting said sound track, the other surface having the text imprinted thereon, the sound symbols of said text being in superposed position and extent and running concurrently with corresponding sound producing increments of said sound track so that the sound symbols may be read directly from the text as the sound is produced.

3. In a self-teaching device for concurrently exercising the human senses of sight and hearing, a substantially flat support, a flat strip carried by the support, said strip bearing a line of printed text longitudinally of the strip, a magnetic sound track carried by said strip longitudinally thereof, sound producing increments of the track being superposed with corresponding sound symbols of the text and running concurrently therewith, a manually movable magnetic editing and pickup device, guide means on the support parallel with the strip, and means on the pickup device for engaging the guide means to guide the pickup device along said strip in operative relation to the sound track.

4. In a self-teaching device for concurrently exercising the human senses of sight and hearing, a transparent plastic housing, at least one flat strip carried by the housing, said strip bearing a line of printed text longitudinally of the strip, a magnetic sound track carried by said strip longitudinally thereof, sound producing increments of the track being superposed with corresponding sound symbols of the said printed text and running concurrently therewith, a manually movable magnetic editing and pickup device, guide means impressed in the transparent housing parallel with each supported strip, and means on the pickup device for engaging the guide means to guide the pickup device along said strip in operative contiguous relation to the sound track thereof.

5. In a self-teaching device for concurrently exercising the human senses of sight and hearing, a transparent housing having at least one channel extending the width thereof, at least one flat strip carried by the housing channel, said strip bearing a line of printed text, longitudinally of the strip, a magnetic sound track carried by said strip, longitudinally thereof, sound producing increments of the track being superposed with corresponding sound symbols of the text and running concurrently therewith, a manually movable magnetic editing and pickup device, guide means on the housing parallel to the supported strip, and means on the pickup device for engaging the guide means to guide the pickup device along said strip in operative contiguous relation to the sound track thereof.

6. In a self-teaching device for concurrently exercising the human senses of sight and hearing, a transparent housing having a plurality of channels extending the width thereof, a plurality of flat strips carried by the housing channel, said strips bearing lines of printed text longitudinally of the strips, magnetic sound tracks carried by said strips longitudinally thereof, sound producing increments of the tracks being superposed with corresponding sound symbols of the text and running concurrently therewith, a manually movable magnetic editing and pickup device, a plurality of external guide conduits parallel the said housing channels and supported strips and means on the pickup device for engaging the guide conduits to guide the pickup device along said strip in operative relation to the sound track.

LOYD T. FROST.

REFERENCES CITED

The following references are of record in the file of this patent:

UNITED STATES PATENTS

| Number | Name | Date |
|---|---|---|
| 1,170,325 | Poposkey | Feb. 1, 1916 |
| 1,453,741 | Brodeur | May 1, 1923 |
| 2,228,782 | Sharples | Jan. 14, 1941 |
| 2,412,061 | Quidas | Dec. 3, 1946 |
| 2,420,716 | Morton et al. | May 20, 1947 |

OTHER REFERENCES

"An Electronic Reading Aid for the Blind"; Zworykin and Flory, Proceedings of the American Philosophical Society, vol. 91, No. 2, 1947, April.